United States Patent
Sayeedi et al.

(10) Patent No.: US 7,227,848 B2
(45) Date of Patent: Jun. 5, 2007

(54) METHOD AND APPARATUS FOR SUPPORTING MULTIPLE PACKET DATA SERVICE CONNECTIONS

(75) Inventors: Shahab M. Sayeedi, Naperville, IL (US); Sean S. Kelley, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 781 days.

(21) Appl. No.: 10/727,789

(22) Filed: Dec. 4, 2003

(65) Prior Publication Data

US 2004/0109423 A1 Jun. 10, 2004

Related U.S. Application Data

(60) Provisional application No. 60/431,556, filed on Dec. 6, 2002.

(51) Int. Cl.
*H04Q 7/20* (2006.01)
(52) U.S. Cl. .................. 370/328; 370/331; 370/913; 455/437
(58) Field of Classification Search ............ 370/230, 370/231, 328, 329, 335, 338, 341, 342, 431, 370/441, 331, 912, 913; 455/436, 437, 438, 455/439, 450, 509
See application file for complete search history.

(56) References Cited

U.S. PATENT DOCUMENTS

| | | | |
|---|---|---|---|
| 6,363,058 B1 | 3/2002 | Roobol et al. | |
| 6,490,453 B1 | 12/2002 | Lee et al. | |
| 6,606,311 B1 | 8/2003 | Wang et al. | |
| 6,654,360 B1 | 11/2003 | Abrol | |
| 6,768,726 B2 * | 7/2004 | Dorenbosch et al. | 370/331 |
| 6,950,657 B1 * | 9/2005 | Hiller et al. | 455/442 |
| 6,963,550 B2 * | 11/2005 | Choi et al. | 370/331 |
| 7,035,636 B1 * | 4/2006 | Lim et al. | 455/435.2 |
| 7,065,062 B2 * | 6/2006 | Madour et al. | 370/331 |

* cited by examiner

*Primary Examiner*—Quochien B. Vuong
(74) *Attorney, Agent, or Firm*—Jeffrey K. Jacobs

(57) ABSTRACT

To address the need to support multiple packet data service instances in a more efficient manner, various signaling enhancements are provided. These enhancements will result in faster packet data call setups, reactivations, and dormant handoffs of multiple service instances while reducing over-the-air signalling. For originations of multiple packet data service connections, the mobile (101) requests the setup of up to six service instances with a single origination message (e.g., 400). For packet data dormant handoffs, the mobile requests the handoff of up to six service instances using a single message. And for reactivations, the mobile requests the reconnection of multiple, dormant packet data service instances with a single message.

31 Claims, 5 Drawing Sheets

400

| ORIGINATION MESSAGE FIELDS | LENGTH (bits) |
|---|---|
| [...] | |
| SERVICE_OPTION | 0 OR 16 |
| [...] | |
| DRS | 0 OR 1 |
| [...] | |
| SR_ID | 0 OR 3 |
| [...] | |
| SYNC_ID_LEN | 0 OR 4 |
| SYNC_ID | 0 OR (8 X SYNC_ID_LEN) |
| [...] | |
| ADD_SR_ID_INCL | 0 OR 1 |
| NUM_ADD_SR_ID | 0 OR 3 |

NUM_SR_ID+1 OCCURENCES OF THE FOLLOWING VARIABLE-FIELD RECORD:

| ADD_SR_ID | 3 |
|---|---|
| ADD_SERVICE_OPTION_INCL | 0 OR 1 |
| ADD_SERVICE_OPTION | 0 OR 16 |

| ORIGINATION MESSAGE FIELDS | LENGTH (bits) |
|---|---|
| [...] | |
| SERVICE_OPTION | 0 OR 16 |
| [...] | |
| DRS | 0 OR 1 |
| [...] | |
| SR_ID | 0 OR 3 |
| [...] | |
| SYNC_ID_LEN | 0 OR 4 |
| SYNC_ID | 0 OR (8 X SYNC_ID_LEN) |
| [...] | |
| SR_ID_BITMAP | 0 OR 6 |
| SERVICE_OPTION_LIST | 0 OR VARIABLE (UP TO 6 X 16) |

*FIG. 5*

METHOD AND APPARATUS FOR SUPPORTING MULTIPLE PACKET DATA SERVICE CONNECTIONS

REFERENCE(S) TO RELATED APPLICATION(S)

The present application claims priority from provisional application, Ser. No. 60/431,556, entitled "METHOD AND APPARATUS FOR SUPPORTING MULTIPLE PACKET DATA SERVICE CONNECTIONS," filed Dec. 6, 2002, which is commonly owned and incorporated herein by reference in its entirety.

FIELD OF THE INVENTION

The present invention relates generally to communication systems and, in particular, to supporting multiple packet data service connections.

BACKGROUND OF THE INVENTION

IS-2000 requires a mobile requesting the setup of a packet data application requiring multiple service instances to originate each of the services instances sequentially. If a traffic channel has not been assigned to a mobile, the mobile will first send an Origination Message (ORM) to the base station (BS) followed by an Enhanced Origination Message (EOM) for each of the additional service instances required to support the application. If a traffic channel has already been assigned to a mobile, the mobile sends an EOM for each of the additional service instances required to support the application.

For reconnection of a packet data application that is dormant, IS-2000 allows a mobile to request the reactivation of a single packet data service instance by including the service reference identifier (i.e., the SR_ID) for the service instance in the ORM/EOM, or the mobile may request reactivation of all dormant service instances in the mobile by setting the SR_ID field to "7" (per IS-2000-C). If the mobile requires the reactivation of more than one, but not all dormant service instances in the mobile, the mobile is required to send multiple ORM/EOM, one for each of the dormant service instances required by the packet data application.

Moreover, when a handoff is required for dormant packet data service instances, IS-2000 requires the mobile to send multiple ORM/EOM to the BS to request a handoff for each of the dormant service instances in the mobile. Each message includes an SR_ID and service option field associated with a single service instance.

The use of multiple messages for these service requests wastes valuable air interface resources and increases the overall delay to complete the service requests. Thus, a need exists for an apparatus and method to support multiple packet data service instances in a more efficient manner.

BRIEF DESCRIPTION OF THE DRAWINGS

FIG. 4 is a block diagram depiction of an Origination message in accordance with a first embodiment of the present invention.

FIG. 5 is a block diagram depiction of an Origination message in accordance with a second embodiment of the present invention.

DETAILED DESCRIPTION OF EMBODIMENTS

To address the need to support multiple packet data service instances in a more efficient manner, various signaling enhancements are provided. These enhancements will result in faster packet data call setups, reactivations, and dormant handoffs of multiple service instances while reducing over-the-air signalling. For originations of multiple packet data service connections, the mobile requests the setup of up to six service instances with a single origination message. For packet data dormant handoffs, the mobile requests the handoff of up to six service instances using a single message. And for reactivations, the mobile requests the reconnection of multiple, dormant packet data service instances with a single message.

Figure 1:
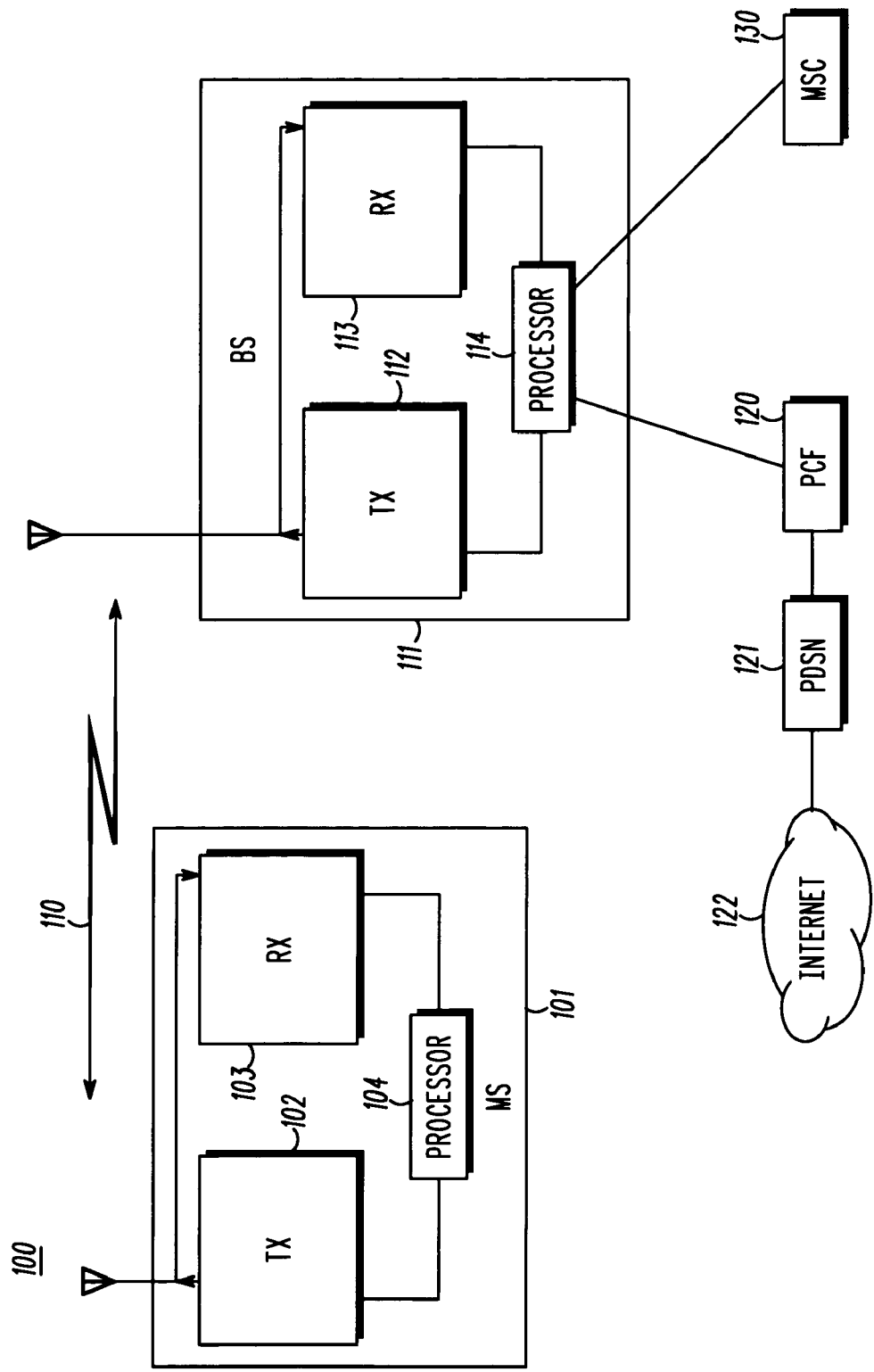
FIG. 1 is a block diagram depiction of a communication system in accordance with an embodiment of the present invention.

The disclosed embodiments can be more fully understood with reference to FIGS. 1-6. FIG. 1 is a block diagram depiction of a communication system 100 in accordance with an embodiment of the present invention. Communication system 100 is a well-known Code Division Multiple Access (CDMA) system, specifically a cdma2000 system, which is based on the Telecommunications Industry Association/Electronic Industries Association (TIA/EIA) standard IS-2000, suitably modified to implement the present invention. The IS-2000 standard is hereby incorporated by reference. (The TIA/EIA can be contacted at 2001 Pennsylvania Ave. NW, Washington, D.C. 20006). In various embodiments, communication system 100 may utilize other cellular communication system protocols such as, but not limited to, IS-856 (HRPD).

Communication system 100 includes radio access network (RAN) entities, such as BS 111 (comprising one or more BTSs), PCF 120, PDSN 121, and MSC 130, and includes remote units, such as mobile station (MS) 101. However, the present invention is not limited to remote units or MSs that are mobile. For example, a remote unit may comprise a desktop computer wirelessly connected to the radio access network.

Those skilled in the art will recognize that FIG. 1 does not depict all of the network equipment necessary for system 100 to operate but only those system blocks and logical entities particularly relevant to the description of embodiments of the present invention. Those skilled in the art are aware of the many ways each of these entities can be implemented and/or purchased from wireless communications companies such as "MOTOROLA."

MS 101 and BS 111 comprise well-known entities such as processors 104 and 114, transmitters 102 and 112, and receivers 103 and 113. Processors, for example, typically comprise components such as microprocessors, digital signal processors, memory, and/or logic circuitry designed to implement algorithms that have been expressed as computer instructions and/or in circuitry. Given an algorithm or a logic flow, those skilled in the art are aware of the many design and development techniques available to implement a processor that performs the given logic.

Typically, transmitters and receivers are components of RAN base stations (BSs), and typically BSs interface with other RAN devices such as mobile switching centers (MSCs), packet control functions (PCFs), and packet data serving nodes (PDSNs). As shown in FIG. 1, BS 111 interfaces to Internet 122 via PCF 120 and PDSN 121 and interfaces to the public telephone system via MSC 130. In a first embodiment of the present invention, a known CDMA 2000 BS is adapted using known telecommunications design and development techniques to implement the BS aspect of the present invention. The result is BS 111.

BS 111 and MS 101 communicate via CDMA 2000 air interface resource 110. MS 101 comprises processor 104, receiver 103, and transmitter 102. Transmitters, receivers, and processors as used in CDMA MSs are all well known in the art. This common set of MS components is adapted using known telecommunications design and development techniques to implement the wireless unit aspect of the present invention.

Operation of a first embodiment, in accordance with a first embodiment of the present invention, occurs substantially as follows. MS processor 104 generates a message that requests a service request operation, such as a connection origination, a connection reactivation (i.e., a reconnection), or a dormant handoff, for multiple packet data connections between MS 101 and PDSN 121. These connections, or service instances, are each individually identified using a service reference identifier value (an SR_ID) in a message field or using a bit value in a bitmap. Processor 104 then instructs transmitter 102 to transmit the message to BS 111.

Figure 2:
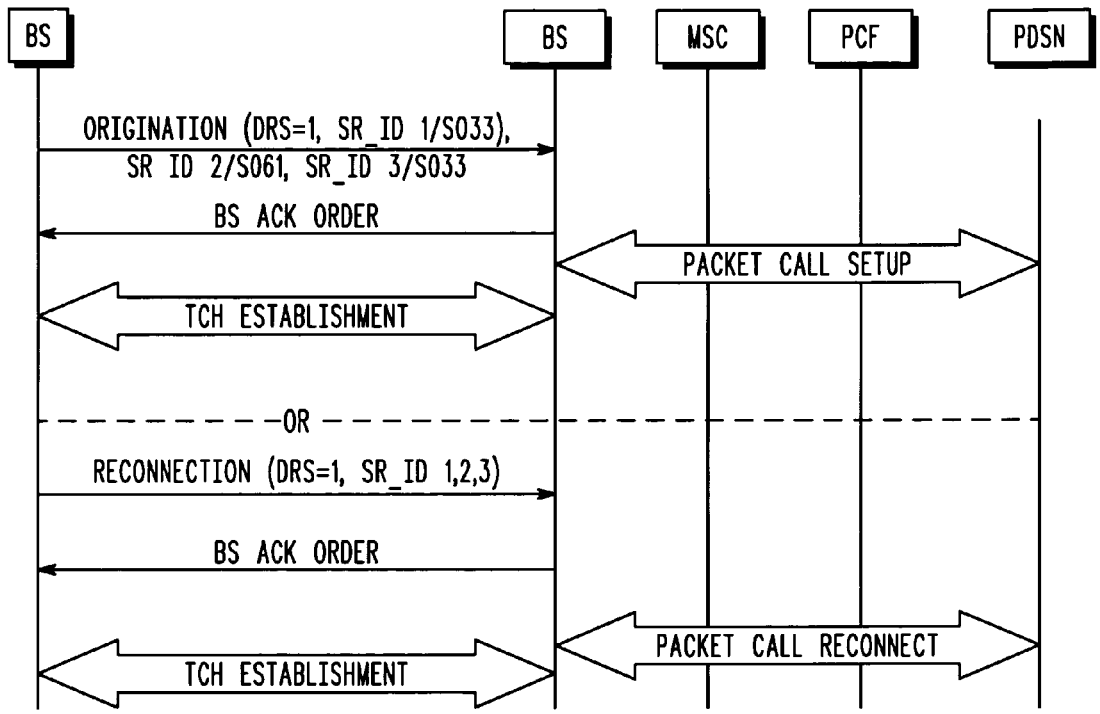
FIG. 2 is a message flow diagram of messaging and procedures performed in accordance with an embodiment of the present invention.
Figure 3:
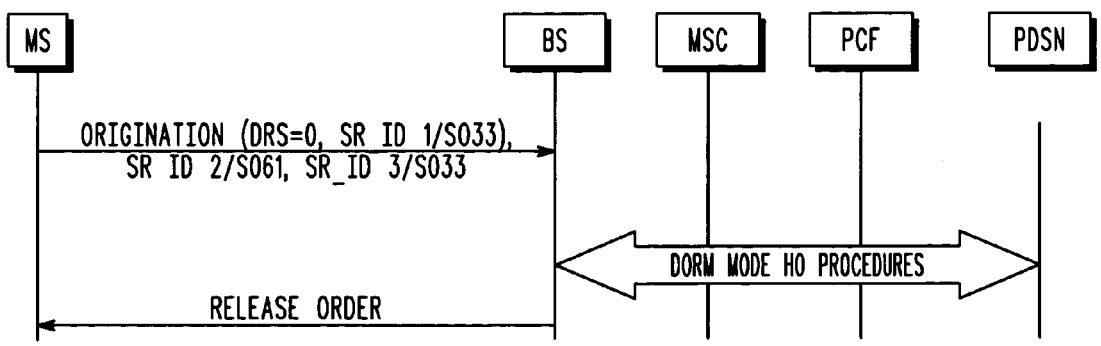
FIG. 3 is a message flow diagram of messaging and procedures performed in accordance with an embodiment of the present invention.

BS processor 114 receives the message via receiver 113 and processes the message in order to facilitate the service request operation indicated. Message flow diagrams 200 and 300, as shown in FIGS. 2 and 3 respectively, illustrate this messaging. In addition, message flow diagrams 200 and 300 illustrate the related messaging and procedures that occurs primarily between an MS, a BS, and a PDSN, such as MS 101, BS 111, and PDSN 121, to facilitate the service request operation indicated.

Message flow 200 illustrates a single Origination message and a single Reconnection message, which request connection origination/reconnection for SR_IDs 1, 2, and 3. Prior art IS-2000 messaging would require three messages instead of either single message. For the origination case, after receiving the Origination message, the BS acknowledges it, and the BS and MS exchange the required messaging to establish a traffic channel (TCH). The BS also begins packet call setup procedures with the PDSN in order to establish the packet data connections for service instances 1, 2, and 3 between the MS and PDSN.

Message flow 300 illustrates a single Origination message that requests dormant handoff for SR_IDs 1, 2, and 3. Prior art IS-2000 messaging would require six messages instead. After receiving the Origination message, the BS begins dormant mode handoff procedures with the PDSN and sends a release to the MS, if a traffic channel is not required.

FIG. 4 is a block diagram depiction of an Origination message 400 in accordance with a first embodiment of the present invention. Each field relevant to the first embodiment is shown in FIG. 4 with its associated bit-length. Most fields shown have a bit length of "0 or" followed by a number. This indicates, of course, that that field may not be included in the message. The SERVICE_OPTION, DRS, SR_ID, SYNC_ID_LEN, and SYNC_ID fields are all part of the present IS-2000 Origination message. The remaining fields explicitly shown in message 400 are proposed for the first embodiment of the present invention as described in detail below.

First, a more general description is in order. Service options refer to specific packet data services, such as high speed data and voice over IP (VoIP). Message 400 includes a message extension that includes a record for each SR_ID indicated in the message extension. Each SR_ID refers to a packet data, MS-PDSN connection. Some Origination messages will include one or more service option indicators that indicate a service option value to correspond to one or more of these packet data connections.

As shown in FIG. 4, message 400 includes an SR_ID field, a SERVICE_OPTION field, an ADD_SR_ID (additional SR_ID) field, and an ADD_SERVICE_OPTION (additional service option) field. An ADD_SR_ID_INCL field, a NUM_ADD_SR_ID field, and an ADD_SERVICE_OPTION_INCL field are also shown. These fields indicate whether a particular message includes one or more additional SR_IDs, how many additional SR_IDs, and whether a particular message includes one or more additional service options, respectively.

A detailed description of each field in the message extension of message 400 follows:

ADD_SR_ID_INCL Additional service reference identifiers included indicator.
  If this messaging is supported (i.e., if $P\_REV\_IN\_USE_S$ is less than eleven), or if the DRS field is set to "1" and either the SYNC_ID field is set to "0" or the SR_ID field is set to "111", then the MS shall omit this field; otherwise, the mobile station shall include this field and set it as follows:
  If the DRS field is set to "0" and the MS is performing dormant handoff of a single packet data service instance, or if the DRS field is set to "1" and the mobile station requests restoration of a single service option connection from the stored service configuration, then the MS shall set this field to "0"; otherwise, the mobile station shall set this field to "1".

NUM_ADD_SR_ID Number of additional service reference identifiers included.
  If ADD_SR_ID_INCL is not included or is included and set to "0", the mobile station shall omit this field; otherwise, the mobile station shall include this field and set it to one less than the number of occurrences of the ADD_SR_ID field included in this message.

If ADD_SR_ID_INCL is included and set to '1', then the mobile station shall include NUM_ADD_SR_ID+1 occurrences of the following variable-field record:

ADD_SR_ID Additional service reference identifier.
  If the DRS field is set to '0' and the MS is performing dormant handoff of an additional packet data service instance, or if the DRS field is set to '1' and the mobile station requests restoration of an additional service option connection from the stored service configuration, then the MS shall set this field to the corresponding service reference identifier.

ADD_SERVICE_OPTION_INCL
  Additional service option included indicator.
  If the SYNC_ID field is set to '1', then the mobile station shall omit this field; otherwise, the mobile station shall include this field and set it as follows:
  The mobile station shall set this field to '0' if the service option number of the service corresponding to the ADD_SR_ID field of this record is the same as SERVICE_OPTION; otherwise, the mobile station shall set this field to '1'.

ADD_SERVICE_OPTION Additional service option number.

If the ADD_SERVICE_OPTION_INCL field is set to '0', the mobile station shall omit this field; otherwise, the mobile station shall include this field and set it to the service option number of the service corresponding to the ADD_SR_ID field of this record.

Origination message 400 is shown and described above in accordance with the first embodiment of the present invention. Origination message 600, as shown in FIG. 5, represents a second and alternative embodiment of the present invention. Message 400 individually identified the MS-PDSN connections using an SR_ID in individual message fields. Instead, Origination message 600 individually identifies the MS-PDSN connections using bit values in a bitmap, specifically, the SR_ID_BITMAP field. A detailed description of the fields in message 600 relevant to the second embodiment follows:

SPECIAL_SERVICE Special service option indicator.
   To request a single special service option, the mobile station shall set this field to '1'. To request the default service option (Service Option 1) or multiple service options, the mobile station shall set this field to '0'.

SERVICE_OPTION Requested service option for this origination.
   If the SPECIAL_SERVICE field is set to '1', the mobile station shall set this field to the value specified in [30], corresponding to the requested service option.
   If the SPECIAL_SERVICE field is set to '0' and the SERVICE_OPTION_LIST field is not included, the mobile station shall omit this field to request the default service option. If the SERVICE_OPTION_LIST field is included, the mobile station shall omit this field.

SR_ID Service reference identifier.
   If $P\_REV\_IN\_USE_S$ is less than six, the mobile station shall omit this field; otherwise, the mobile station shall include this field and set it as follows:
   If the SYNC_ID_INCL field is not included or is included and is set to '0', the mobile station shall set this field as follows:
      If the service instance provides a service reference identifier, the mobile station shall set this field to the service reference identifier specified by the service instance. If the service instance does not provide a service reference identifier, the mobile station shall set this field to the smallest unused service reference identifier value between 1 and 6 (inclusive). If the SR_ID field is set to '0', refer to the SR_ID_BITMAP field for a list of service reference identifiers.
   Otherwise, the mobile station shall set this field as follows:
      If the mobile station requests the restoration of a single service option connection from the stored service configuration, the mobile station shall set this field to the corresponding service reference identifier; otherwise (that is, the mobile station requests the restoration of all the service option connections from the stored service configuration), the mobile station shall set this field to '111'.

SR_ID_BITMAP Service Reference Identifier Bitmap
   If $P\_REV\_IN\_USE_S$ is less than nine (or another appropriate revision), the mobile station shall omit this field. If the SR_ID field is not included, or is included but is not set to '0', the mobile station shall omit this field; otherwise, the mobile station shall include this field and set it as follows.
   This field contains a bitmap list of SR_IDs requested for originating, reconnecting, or dormant handoff of a packet data call. Bits 1-6 map to SR_IDs 1-6. At least two SR_IDs are specified.

| SR_ID_BITMAP | |
| --- | --- |
| Value (binary) | SR_ID Requested |
| xxxxxx1 | SR_ID=1 |
| xxxxx1x | SR_ID=2 |
| xxxx1xx | SR_ID=3 |
| xxx1xxx | SR_ID=4 |
| xx1xxxx | SR_ID=5 |
| x1xxxxx | SR_ID=6 |
| 1xxxxxx | SR_ID=7 |

SERVICE_OPTION_LIST Service Option List
   If the SR_ID_BITMAP field is not included, the mobile station shall omit this field; otherwise, the mobile station shall include this field and set it as follows.
   This field contains the list of Service Options associated with each SR_ID requested by the mobile specified in SR_ID_BITMAP. The mobile station shall set the fields to the value specified in [30], corresponding to the requested service options. 2-6 Service Options may be present. The first service option corresponds to the service instance with the smallest SR_ID value in the SR_ID_BITMAP field; the last Service Option in the list corresponds to the largest SR_ID value in the SR_ID_BITMAP field. The mobile station shall set the fields to the value specified in [30], corresponding to the requested service options.

Figure 6:
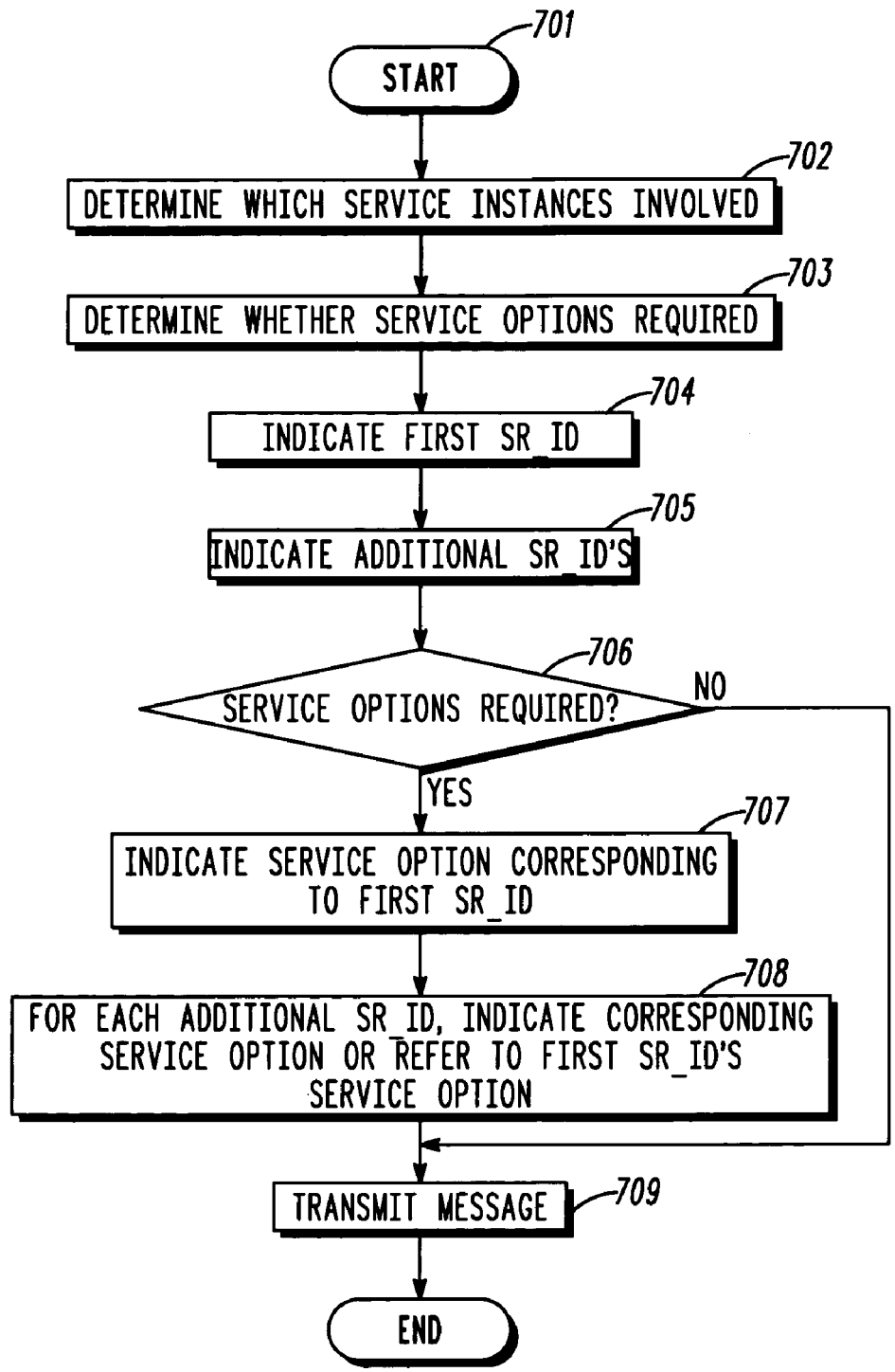
FIG. 6 is a logic flow diagram of steps executed in accordance with an embodiment of the present invention.

Logic flow 700, as shown in FIG. 6, is intended to provide a high-level description of the information gathered and then incorporated into a message extension in accordance with various embodiments of the present invention. Logic flow 700 purposefully does not address the many details of message generation described above in order to summarize the process as a whole. Also, FIG. 6 illustrates but one order in which these general steps may be performed. A person of ordinary skill in the art will recognize that these steps may be performed in a different order or even concurrently depending on the particular design or implementation goals of an implementation.

Logic flow 700 begins (701) with the MS determining (702) which service instances (i.e., which packet data connections) are involved in the service request operation the message is requesting. The MS also determines (703) whether service options for these service instances need to be indicated. For example, the service options do not need to be transmitted to the RAN in the case of a reactivation operation, since the service options associated with each service instance are known as part of the stored service configuration.

To identify the instances individually, the MS indicates (704) a first SR_ID and (705) any additional SR_IDs. For example, for an Origination message in the first embodiment, the first SR_ID is indicated in the message body, while the additional SR_IDs are indicated in individual records in the message extension. For an Origination message in the second embodiment, the SR_IDs are indicated together in a bitmap.

If (706) service options are not required in the message, the message (including its extension) can be transmitted to the RAN, and the logic flow ends (710). Otherwise, the MS indicates (707) a service option corresponding to the first SR_ID and (708) service options for each additional SR_ID. For example, for an Origination message in the first embodiment, the service option corresponding to the first SR_ID is indicated in the message body, and service options for each additional SR_ID are indicated in the message extension. Because a number of SR_IDs may have the same corresponding service option, this embodiment also provides that the service option corresponding to the first SR_ID be a default service option for SR_IDs for which no other service option is indicated.

The present embodiments describe how the IS-2000 Origination, Enhanced Origination, and Reconnect messages can be enhanced to support multiple packet data connections for existing service instances requiring dormant mode handoffs or reactivation, or for each new service instances requested. For example, when a dormant mode handoff is required for a packet data session, the mobile will only be required to send one IS-2000 Origination or Enhanced Origination message for all service instance connections requiring a dormant mode handoff to a new BS. When new service instance connections are requested, the mobile will only be required to send one IS-2000 Origination message regardless of how many connections are required.

This is useful for example when a user wants to make a VoIP call, the mobile will only be required to send one Origination message requesting both the main high speed packet data service option connection and the VoIP SO connection. Multiple occurrences of the Service Option element are also described herein. While dormant mode handoffs currently only occur for high speed packet data SO 33 (not required for circuit voice/data, Voice Over IP), the messages are future-proofed by including a SO identifier for each dormant service instance to allow for efficient dormant mode handoff of new packet data service options that will be supported in the future.

The present application addresses the problem described above by greatly reducing over the air signaling required to support multiple packet data connections in the RAN. This will lead to faster packet call originations, dormant mode handoffs and reactivations, and thus, increased call capacity in the network and increased battery life in mobiles, particularly in networks where packet zones are small and frequent dormant mode handoffs occur.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for supporting multiple packet data service connections comprising:
   generating, by a mobile station (MS), a message that requests a service request operation for a plurality of packet data connections; and
   transmitting the message to a base station (BS) in order to request the service request operation for the plurality of connections, wherein each of the plurality of connections is a connection between the MS and a radio access network (RAN), wherein each of the plurality of connections is individually identified using a service reference identifier value in a message field, and wherein the service request operation comprises an operation from a group of operations consisting of connection origination, connection reactivation, and dormant mode handoff.

2. The method of claim 1, wherein the message includes a message extension that includes a record for each service reference identifier value indicated in the message extension and wherein each record indicates one of the service reference identifier values.

3. The method of claim 2, wherein generating the message comprises further indicating in at least one of the records a service option value that corresponds to the service reference identifier value indicated in that record.

4. The method of claim 2, wherein generating the message comprises further indicating in at least one of the records that a service option value indicated outside of that record corresponds to the service reference identifier value indicated in that record.

5. The method of claim 2, wherein each service reference identifier value after a first service reference identifier value is indicated in the message extension.

6. The method of claim 2, wherein the message extension indicates how many service reference identifier values are indicated in the message extension.

7. The method of claim 1, wherein the message further comprises a service option indicator that indicates a service option value to correspond to at least one of the plurality of connections individually identified.

8. The method of claim 7, wherein the message further comprises at least one additional service option indicator that indicates a service option value to correspond to one of the plurality of connections individually identified.

9. The method of claim 8, wherein the message further comprises an indication of whether an at least one additional service option indicator is included in the message.

10. The method of claim 1, wherein the message comprises a CDMA Origination message.

11. The method of claim 1, wherein the message comprises a CDMA Enhanced Origination message.

12. The method of claim 1, wherein the message comprises a CDMA Reconnect message.

13. A method for supporting multiple packet data service connections comprising:
generating, by a mobile station (MS) a message that requests a service request operation for a plurality of packet data connections; and
transmitting the message to a base station (BS) in order to request the service request operation for the plurality of connections, wherein each of the plurality of connections is a connection between the MS and a radio access network (RAN), wherein each of the plurality of connections is individually identified using a bit value in a bitmap, and wherein the service request operation comprises an operation from a group of operations consisting of connection origination, connection reactivation, and dormant mode handoff.

14. The method of claim 13, wherein the message further comprises a service option indicator that indicates a service option value to correspond to at least one of the plurality of connections individually identified.

15. The method of claim 14, wherein the message further comprises at least one additional service option indicator that indicates a service option value to correspond to one of the plurality of connections individually identified.

16. A method for supporting multiple packet data service connections comprising:
receiving, by a base station (BS) from a mobile station (MS), a message that requests a service request operation for a plurality of packet data connections; and
processing the message in order to facilitate the service request operation for the plurality of connections, wherein each of the plurality of connections is a connection between the MS arid a radio access network (RAN), wherein each of the plurality of connections is individually identified using a service reference identifier value in a message field, and wherein the service request operation comprises an operation from a group of operations consisting of connection origination, connection reactivation, and dormant mode handoff.

17. The method of claim 16, wherein the message includes a message extension that includes a record for each service reference identifier value indicated in the message extension and wherein each record indicates one of the service reference identifier values.

18. The method of claim 17, wherein at least one of the records further indicates a service option value that corresponds to the service reference identifier value indicated in that record.

19. The method of claim 17, wherein at least one of the records further indicates that a service option value indicated outside of that record corresponds to the service reference identifier value indicated in that record.

20. The method of claim 17, wherein each service reference identifier value after a first service reference identifier value is indicated in the message extension.

21. The method of claim 17, wherein the message extension indicates how many service reference identifier values are indicated in the message extension.

22. The method of claim 16, wherein the message further comprises a service option indicator that indicates a service option value to correspond to at least one of the plurality of connections individually identified.

23. The method of claim 22, wherein the message further comprises at least one additional service option indicator that indicates a service option value to correspond to one of the plurality of connections individually identified.

24. The method of claim 23, wherein the message further comprises an indication of whether an at least one additional service option indicator is included in the message.

25. A method for supporting multiple packet data service connections comprising:
receiving, by a base station (BS) from a mobile station (MS), a message that requests a service request operation for a plurality of packet data connections; and
processing the message in order to facilitate the service request operation for the plurality of connections, wherein each of the plurality of connections is a connection between the MS and a radio access network (RAN), wherein each of the plurality of connections is individually identified using a bit value in a bitmap, and wherein the service request operation comprises an operation from a group of operations consisting of connection origination, connection reactivation, and dormant mode handoff.

26. The method of claim 25, wherein the message further comprises a service option indicator that indicates a service option value to correspond to at least one of the plurality of connections individually identified.

27. The method of claim 26, wherein the message further comprises at least one additional service option indicator that indicates a service option value to correspond to one of the plurality of connections individually identified.

28. A mobile station (MS) comprising:
a transmitter; and
a processor, communicatively coupled to the transmitter, adapted to generate a message that requests a service request operation for a plurality of packet data connections and adapted to instruct the transmitter to transmit the message to a base station (BS) in order to request the service request operation for the plurality of connections, wherein each of the plurality of connections is a connection between the MS and a radio access network (RAN), wherein each of the plurality of connections is individually identified using a service reference identifier value in a message field, and wherein the service request operation comprises an operation from a group of operations consisting of connection origination, connection reactivation, and dormant mode handoff.

29. A mobile station (MS) comprising:
a transmitter; and
a processor, communicatively coupled to the transmitter, adapted to generate a message that requests a service request operation for a plurality of packet data connections and adapted to instruct the transmitter to transmit the message to a base station (BS) in order to request the service request operation for the plurality of connections, wherein each of the plurality of connections is a connection between the MS and a radio access network (RAN), wherein each of the plurality of connections is individually identified using a bit value in a bitmap, and wherein the service request operation comprises an operation from a group of operations consisting of connection origination, connection reactivation, and dormant mode handoff.

30. A base station (BS) comprising:

a receiver; and a processor, communicatively coupled to the receiver, adapted to receive via the receiver a message from a mobile station (MS) that requests a service request operation for a plurality of packet data connections and adapted to process the message in order to facilitate the service request operation for the plurality of connections, wherein each of the plurality of connections is a connection between the MS and a radio access network (RAN), wherein each of the plurality of connections is individually identified using a service reference identifier value in a message field, and wherein the service request operation comprises an operation from a group of operations consisting of connection origination, connection reactivation, and dormant mode handoff.

31. A base station (BS) comprising:

a receiver; and a processor, communicatively coupled to the receiver, adapted to receive via the receiver a message from a mobile station (MS) that requests a service request operation for a plurality of packet data connections and adapted to process the message in order to facilitate the service request operation for the plurality of connections, wherein each of the plurality of connections is a connection between the MS and a radio access network (RAN), wherein each of the plurality of connections is individually identified using a bit value in a bitmap, and wherein the service request operation comprises an operation from a group of operations consisting of connection origination, connection reactivation, and dormant mode handoff.

* * * * *